US012613387B2

(12) United States Patent
Maruo et al.

(10) Patent No.: US 12,613,387 B2
(45) Date of Patent: Apr. 28, 2026

(54) OPTICAL FIBER CABLE

(71) Applicant: NTT, Inc., Tokyo (JP)

(72) Inventors: Yuta Maruo, Musashino (JP); Hiroaki Tanioka, Musashino (JP); Shigekatsu Tetsutani, Musashino (JP); Yusuke Yamada, Musashino (JP); Akira Sakurai, Musashino (JP)

(73) Assignee: NTT, Inc., Tokyo (JP)

( * ) Notice: Subject to any disclaimer, the term of this patent is extended or adjusted under 35 U.S.C. 154(b) by 568 days.

(21) Appl. No.: 18/016,890

(22) PCT Filed: Jul. 22, 2020

(86) PCT No.: PCT/JP2020/028478
§ 371 (c)(1),
(2) Date: Aug. 7, 2023

(87) PCT Pub. No.: WO2022/018865
PCT Pub. Date: Jan. 27, 2022

(65) Prior Publication Data
US 2023/0314744 A1    Oct. 5, 2023

(51) Int. Cl.
*G02B 6/44* (2006.01)

(52) U.S. Cl.
CPC .......... *G02B 6/4411* (2013.01); *G02B 6/4413* (2013.01); *G02B 6/4429* (2013.01); *G02B 6/4433* (2013.01)

(58) Field of Classification Search
None
See application file for complete search history.

(56) References Cited

U.S. PATENT DOCUMENTS

2016/0018612 A1    1/2016  Czosnowski et al.

FOREIGN PATENT DOCUMENTS

| | | |
|---|---|---|
| CN | 102411181 A | 4/2012 |
| CN | 207601374 U | 7/2018 |
| JP | H10-333000 A | 12/1998 |
| JP | 2005055673 A | 3/2005 |
| JP | 2005-107256 A | 4/2005 |
| JP | 2010-170007 A | 8/2010 |
| JP | 2013-041092 A | 2/2013 |
| JP | 2013-113891 A | 6/2013 |

OTHER PUBLICATIONS

Freeland et al., "Strain Sensing of an In-Road FTTH Field Trial and Implications for Network Reliability", Proc. of IWCS, (2019).

*Primary Examiner* — Jerry Rahll

(57) ABSTRACT

An optical fiber cable of the present disclosure is formed by assembling a plurality of drop optical cables, and each of the drop optical cables has a structure where at least one or more optical fiber cores and a tension fiber or a tension member is embedded in a sheath such that the drop optical cable has two or more axes each having a minimum value of a second moment of area with respect to arbitrary neutral planes, and even an optical cable obtained by assembling drop optical cables has a structure having two or more axes each having a minimum value of the second moment of area with respect to arbitrary neutral planes.

5 Claims, 14 Drawing Sheets

10

OPTICAL FIBER CABLE

CROSS-REFERENCE TO RELATED APPLICATIONS

This application is a 371 U.S. National Phase of International Application No. PCT/JP2020/028478, filed on Jul. 22, 2020. The entire disclosure of the above application is incorporated herein by reference.

TECHNICAL FIELD

The present disclosure relates to an optical fiber cable.

BACKGROUND ART

An optical fiber cable or a drop optical cable is used as a transmission medium for information communication. In a data communication service using fiber-to-the-home (FTTH), an optical fiber cable and a drop optical cable are laid using an overhead wiring technique or an underground wiring technique to be extended to a subscriber's residence or the like.

Conventionally, in most cases where an optical fiber cable or a drop optical cable is newly laid, the optical fiber cable or the drop optical cable is additionally laid in an area where a metallic cable for communication has already been laid. In these cases, since infrastructure equipment such as an electric pole and a conduit have already been prepared, the optical fiber cable can be economically laid without requiring a new civil engineering work. This is due to the fact that, since the place where the communication demand occurs is the same as the place where the conventional metallic cable is wired, additional installation can be performed without newly constructing infrastructure equipment.

When providing optical fibers to a subscriber's residence or a building, it is necessary to connect an optical fiber cable in which a plurality of optical fibers are assembled and a drop optical cable in which one to several optical fibers are assembled. This connection part is made of a housing article for protecting exposed optical fiber (for example, see PTL 1).

In recent years, in order to widely expand an antenna for a cellular phone or the like, it is necessary to lay an optical fiber even in an area in which infrastructure equipment has not been installed. In addition, even though infrastructure equipment is already in place, a need arises to newly provide wiring to a structure such as a street lamp on a road instead of providing wiring to a house or a building. In these cases, a technique for economically wiring an optical cable without civil engineering work as much as possible has been proposed (for example, refer to a NPL 1). In an example of this method, a cable is laid in a groove formed in a road surface.

However, in order to connect the optical fiber cable and the drop optical cable, an operation of taking out an optical fiber from the optical fiber cable and an operation of connecting the optical fiber need to be performed and a housing for housing a connecting device, a connecting component, or a connection part is required. In the case of installing this storage article in a groove dug on a road surface, for example, connection work on the road is required and a length of time during which a worker is exposed to danger is increased.

By laying a plurality of drop optical cables (for example, PTL 2), the optical fiber can be provided to the nearest traffic light, electric pole, or the like without requiring connection work at a branch portion. However, when the drop optical cables are twisted and stepped on, side pressure is locally applied and an occurrence of optical loss may affect the communication service. In addition, there is also a problem in that an operation of checking which drop optical cable is to be cut upon commencing service is required and work time on the road cannot be reduced.

Furthermore, by using a collective drop cable (for example, PTL 3), an optical fiber can be provided without requiring connection work at a branch part. However, a direction of bending in a branched drop optical cable single body is determined, and in order to lay a drop optical cable on a road which is supposed to be bent in a vertical or horizontal direction such as a slope, a curve, or a raised location, it is necessary to lay the optical cable by twisting it just before the position where the drop optical cable is bent. In this case, it is necessary to fix the twisted drop optical cable to the ground by a staple or the like in order to prevent the twisted drop optical cable from returning to its original state, and there is a problem in that work time until service commences increases and the number of fixing parts such as the staple also increases.

CITATION LIST

Patent Literature

[PTL 1] Japanese Patent Application Publication No. 2013-113891A
[PTL 2] Japanese Patent Application Publication No. 2013-41092A
[PTL 3] Japanese Patent Application Publication No. H10-333000A

Non Patent Literature

[NPL 1] Strain Sensing of an In-Road FTTH Field Trial and Implications for Network Reliability, Proc. of IWCS (2019)

SUMMARY OF INVENTION

Technical Problem

An object of the present disclosure is to make it possible to bend and lay an optical fiber cable in a plurality of directions without twisting in both of a cable state and a single-core separation state.

Solution to Problem

An optical fiber cable according to the present disclosure is: an optical fiber cable in which a plurality of drop optical cables are bundled, wherein each of the drop optical cables has, in a cross section perpendicular to a longitudinal direction thereof, two or more neutral planes minimalizing a second moment of area.

Advantageous Effects of Invention

According to the optical fiber cable of the present disclosure, it is possible to lay the optical fiber cable by bending in a plurality of directions without twisting in both of a cable state and a single-core separation state.

DESCRIPTION OF EMBODIMENTS

Figure 1A:
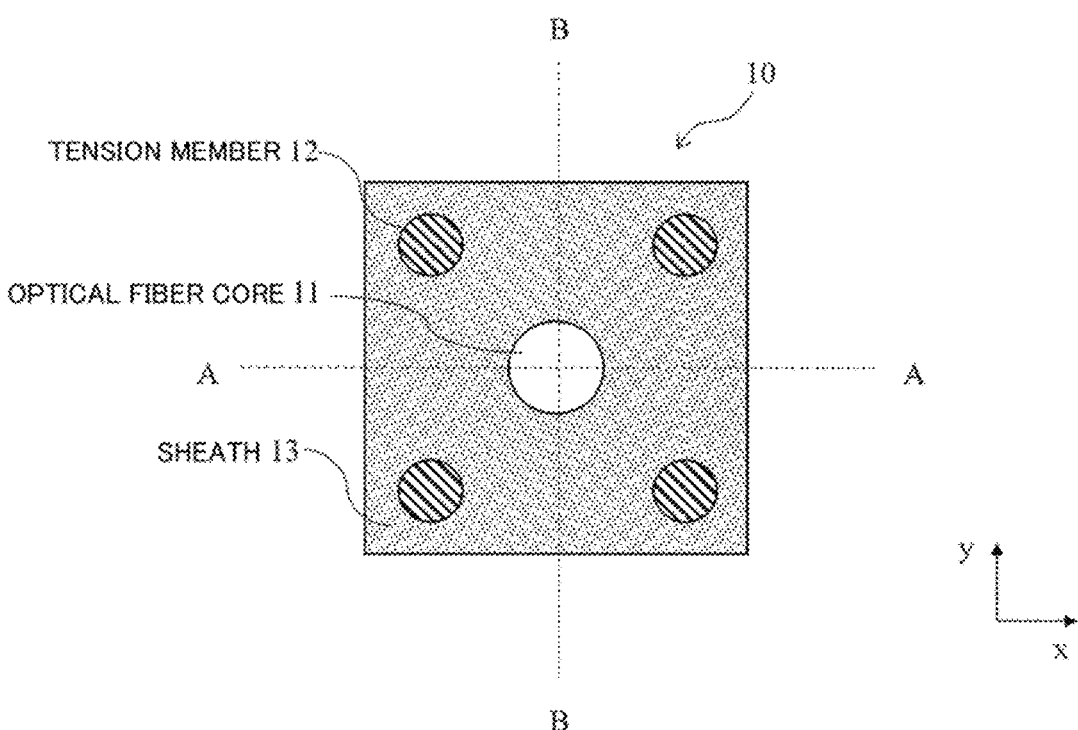
FIG. 1A is a diagram illustrating an example of a structure of a drop optical cable according to the present disclosure.

Embodiments of the present disclosure will be described in detail below with reference to the drawings. The present disclosure is not limited to the embodiments described below. The embodiments are merely illustrative, and the present disclosure can be implemented with a variety of modifications and improvements made thereto on the basis of the knowledge of a person skilled in the art. Note that elements designated by the same reference characters in the description and the drawings refer to the same elements.

Embodiment 1

An example of a structure of an optical fiber cable of the present disclosure will be described with reference to FIGS. 1 to 3.

A cross-sectional structure perpendicular to a longitudinal direction of a drop optical cable is shown in FIG. 1A. The optical fiber cable of the present disclosure is formed by collecting and bundling a plurality of drop optical cables 10. The drop optical cable 10 has a structure in which at least one or more optical fiber cores 11 and a plurality of tension members 12 are embedded in a sheath 13.

In the example shown in FIG. 1A, the cross-sectional shape of the drop optical cable 10 is square, and the tension members 12 are embedded at equal intervals at respective corners on a concentric circle centered on the optical fiber core 11. In this way, tension members 12 the number of which is an even number are embedded in the sheath 13 symmetrically with respect to A-A' in an x-axis direction and symmetrically with respect to B-B' in a y-axis direction.

In the cross-sectional structure symmetrical in the vertical and horizontal directions, the second moment of area is minimized when A-A' and B-B' are neutral planes. In other words, the structure has two or more axes each having a minimum value of the second moment of area with respect to arbitrary neutral planes. For example, in the x-axis direction, a minimum value exists in the cross section B-B', and in the y-axis direction, a minimum value exists in the cross section A-A'. The smaller the second moment of area is, the easier the optical cable is bent, and when the minimum value thereof is provided with two or more axes, a direction of the optical cable bent by the same force is constituted of two or more directions. For example, in the example shown in FIG. 1, it is easy to bend in the x-axis direction and the y-axis direction. However, the second moment of area at A-A' and the second moment of area at plane B-B' may be the same or different.

Figure 1B:
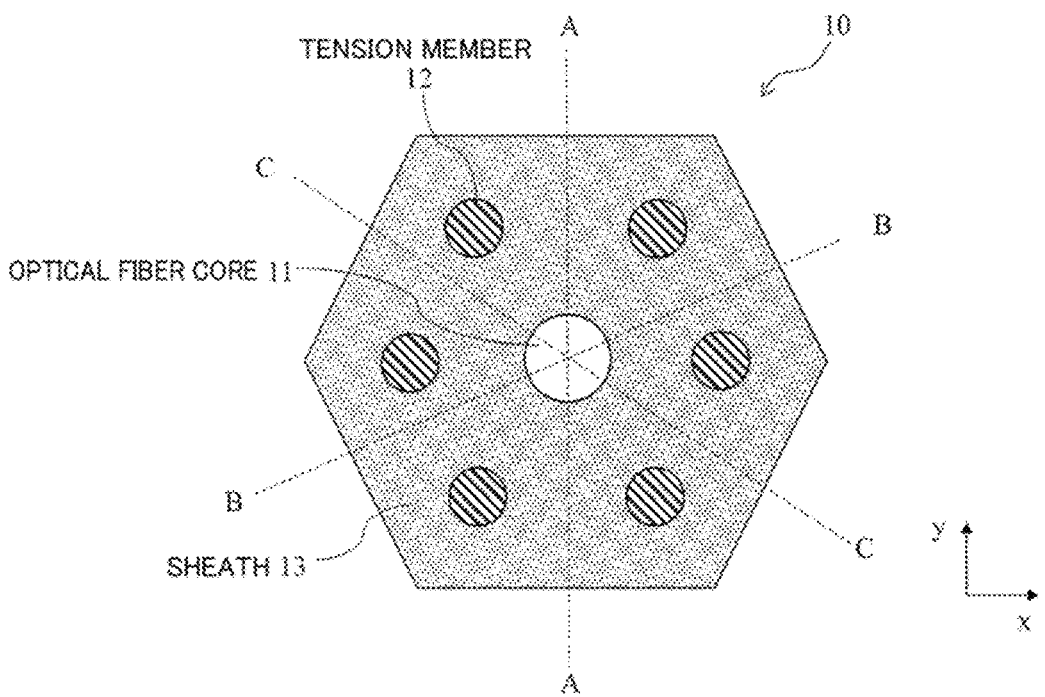
FIG. 1B is a diagram illustrating an example of a structure of a drop optical cable according to the present disclosure.

While the example of FIG. 1A shows an example in which the tension members 12 are arranged one to one at four corners, the present disclosure is not limited thereto. The present disclosure can adopt any configuration that includes an optical fiber core 11 arranged at the center thereof, a sheath 13 covering a periphery of the optical fiber core 11, and tension members 12 symmetrically arranged with respect to neutral planes such that the number of the neutral planes is two or more. For example, the structure may be as shown in FIG. 1B. Tension members 12 may be arranged at respective corners of a triangle, in which three neutral planes may be provided. The cross-sectional shape of such a drop optical cable may be a regular polygon such as a regular triangle, a square, or a regular hexagon in addition to a circle.

Examples of the material of the tension fiber and the tension member 12 are aramid or the like. As the material of the sheath, polyethylene, flame-retardant polyethylene, polyvinyl chloride or the like can be exemplified. The tension member 12 may be a fibrous tension fiber. These structures are similarly adopted in embodiments to be described later.

Figure 2A:
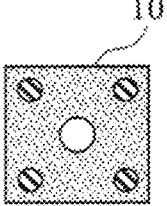
FIG. 2A is a diagram illustrating an example of a structure of an optical fiber cable according to the present disclosure.
Figure 2A:
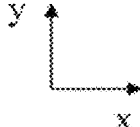
Figure 2B:
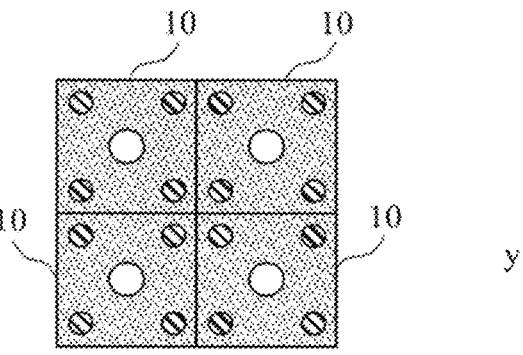
FIG. 2B is a diagram illustrating an example of a structure of an optical fiber cable according to the present disclosure.
Figure 2B:
Figure 2C:
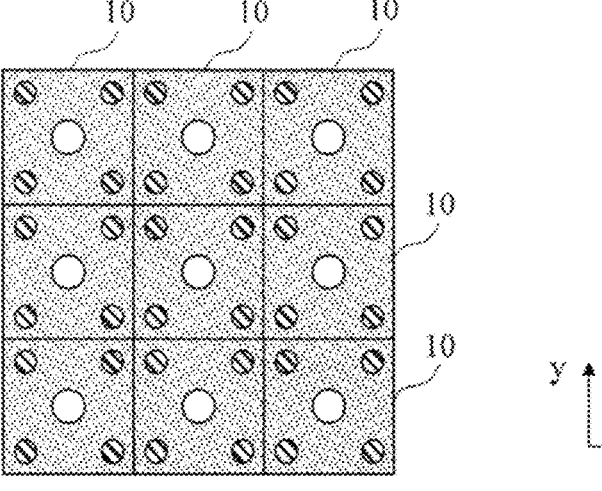
FIG. 2C is a diagram illustrating an example of a structure of an optical fiber cable according to the present disclosure.

In the optical fiber cable according to the present embodiment, as shown in FIGS. 2A to 2C, $N^2$ (where N=1, 2, 3, . . . ) drop optical cables 10 are stacked up so that a collective shape thereof looks like a square. FIG. 2A shows an example of N=1, FIG. 2B shows an example of N=2, and FIG. 2C shows an example of N=3. FIGS. 2A to 2C show an example in which any one neutral plane of the drop optical cables 10 is parallel to the x-axis or y-axis as shown in FIG. 1A. Thus, the optical fiber cable of the present disclosure encompasses an embodiment where the plurality of drop optical cables 10 are arranged so that the directions of the neutral planes minimalizing the second moment of area of each of the drop optical cables 10 coincide with each other.

When any one neutral plane of the drop optical cable 10 as shown in FIG. 1 is parallel to the x-axis or the y-axis, N drop optical cables 10 are arranged in the x-axis direction and N drop optical cables 10 are arranged in the y-axis direction. In this way, the respective neutral planes of the plurality of drop optical cables 10 are arranged in parallel with the sides of the square.

The optical fiber cable formed by assembling the drop optical cables 10 also has a structure having two or more axes each having a minimum value of a second moment of area with respect to arbitrary neutral planes, where the smaller the second moment of area is, the easier the optical fiber cable bends, and the two or more axes each having the minimum value enable the optical cable to be bent by forces in two or more directions with the same magnitude thereof.

Figure 3:
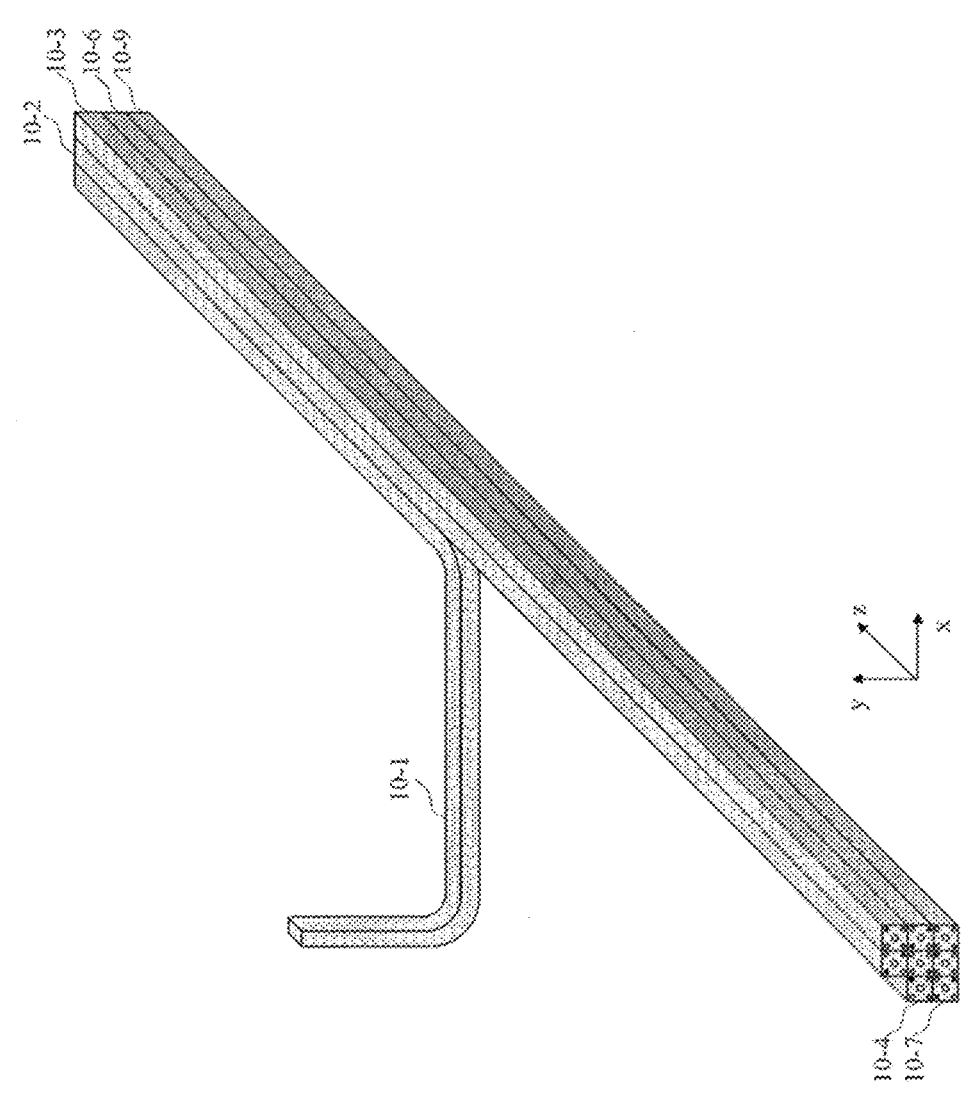
FIG. 3 is a diagram illustrating an example of a structure of an optical cable according to the present disclosure.

FIG. 3 shows an example of laying an optical fiber cable. At this time, the optical fiber cable can be bent freely in the vertical and horizontal directions without depending on the laying direction of the optical fiber cable. Furthermore, the optical fiber can be provided without performing connection work by cutting the drop optical cable 10 at a proper place and tearing the optical fiber by a required length like a drop optical cable 10-1. The drop optical cable 10-1 separated from the optical fiber cable has no dependency on the laying direction and can be bent freely in the longitudinal and lateral directions. Therefore, the optical fiber cable of the present disclosure eliminates the need for work to twist the drop optical cable immediately before a place where the drop optical cable is bent and work to fix the twisted drop optical cable to the ground by a staple or the like so that the twisted drop optical cable does not return to an original state, which are required by conventional collective drop optical cables, and, furthermore, the optical fiber cable can be laid without the need for a fixing part such as a staple.

Embodiment 2

The structure of the optical fiber cable of the present disclosure will be described with reference to FIGS. 4A to 4C.

Figure 4A:
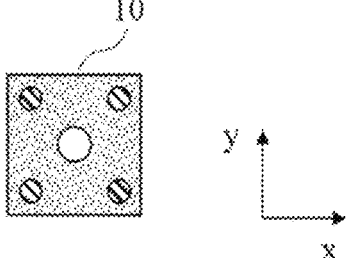
FIG. 4A is a diagram illustrating an example of a structure of an optical cable according to the present disclosure.
Figure 4B:
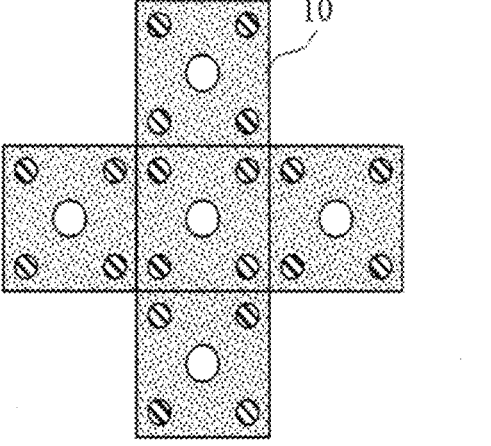
FIG. 4B is a diagram illustrating an example of a structure of an optical cable according to the present disclosure.
Figure 4B:
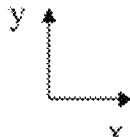
Figure 4C:
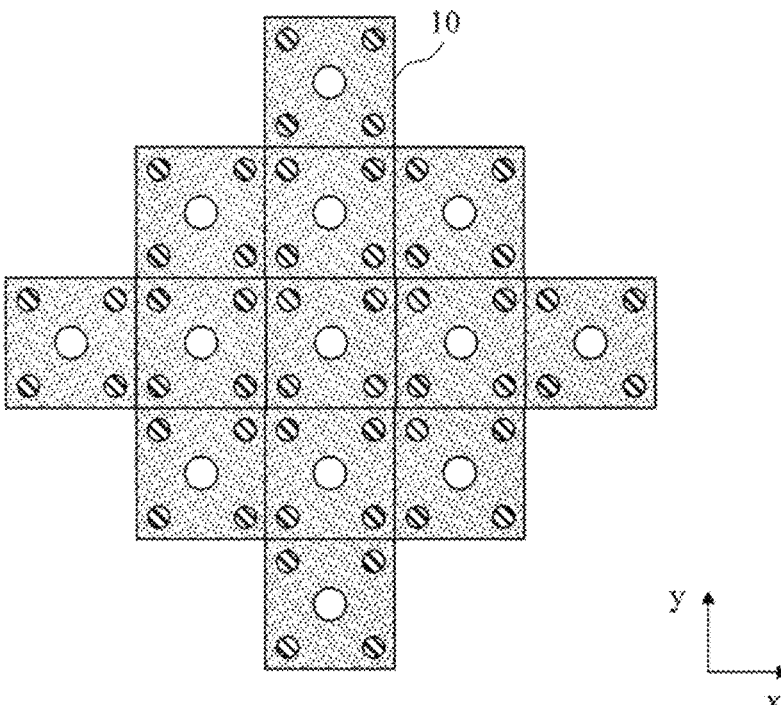
FIG. 4C is a diagram illustrating an example of a structure of an optical cable according to the present disclosure.

As shown in FIGS. 4A to 4C, the optical fiber cable according to the present embodiment has a structure in which $2N^2-2N+1$ (where N=1, 2, 3, . . . ) drop optical cables 10 are stacked up so that a collective shape thereof looks like a rhomboid. FIG. 4A shows an example of N=1, FIG. 4B shows an example of N=2, and FIG. 4C shows an example of N=3. FIGS. 4A to 4C illustrate an example in which any one neutral plane of the drop optical cables 10 is parallel to the x-axis or y-axis as shown in FIG. 1.

In the example of N=2, three drop optical cables 10 are arranged in the x-axis direction and the y-axis direction as shown in FIG. 4B. In the example of N=3, five drop optical cables 10 are arranged in the x-axis direction and the y-axis direction as shown in FIG. 4C. As described above, in the present embodiment, when any one neutral plane of the drop optical cables 10 is parallel to the x-axis or the y-axis, rhombic diagonal lines are arranged in the x-axis direction and the y-axis direction.

An optical fiber cable formed by assembling the drop optical cables 10 also has a structure having two or more axes each having the minimum value of the second moment of area with respect to arbitrary neutral planes. The present optical fiber cable is also independent of the laying direction, the optical fiber cable can be bent freely in the vertical and horizontal directions, and the optical fiber can be provided without performing connecting work. In addition, the drop optical cable 10 separated from the optical fiber cable is also not dependent on the laying direction and can be freely bent in the vertical and horizontal directions. Therefore, the optical fiber cable of the present embodiment eliminates the need for work to twist the drop optical cable immediately before a place where the drop optical cable is bent and work to fix the twisted drop optical cable to the ground by a staple or the like so that the twisted drop optical cable does not return to an original state, which are required by conventional collective drop optical cables, and, furthermore, the optical fiber cable can be laid without the need for a fixing part such as a staple. Furthermore, with the optical fiber cable of the present embodiment, it is easier to cut the drop optical cable than the optical cable stacked in a square shape when cutting the drop optical cable at an appropriate position.

Embodiment 3

A structure of an optical cable of the present disclosure will be described with reference to FIGS. 5 to 6.

Figure 5:
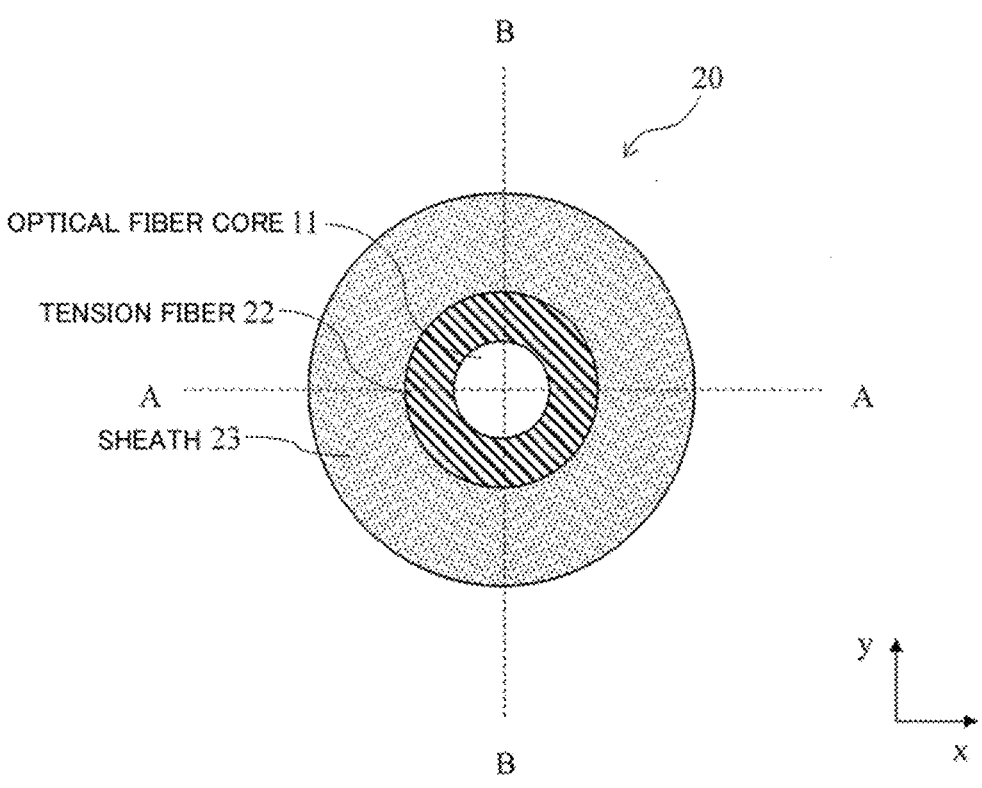
FIG. 5 is a diagram illustrating an example of a structure of a drop optical cable according to the present disclosure.

FIG. 5 shows a structure of a drop optical cable. The cross-sectional shape of the present drop optical cable 20 is, for example, a circular shape or a regular polygon such as an equilateral triangle, a square, or a regular hexagon. The optical fiber cable of the present embodiment is formed by assembling a plurality of drop optical cables 20.

In the example shown in FIG. 5, a periphery of the optical fiber core 11 is covered with the tension fiber 22, and the periphery of the tension fiber 22 is covered with the sheath 23. In this way, each drop optical cable 20 has a structure where at least one or more optical fiber cores and a tension fiber 22 are embedded in the sheath 23 such that each drop optical cable 20 has two or more axes each having a minimum value of a second moment of area with respect to arbitrary neutral planes. In the cross-sectional structure symmetrical in the vertical and horizontal directions, the second moment of area is minimized when A-A' and B-B' are neutral planes. In other words, the structure has two or more axes each having a minimum value of the second moment of area with respect to arbitrary neutral planes. The smaller the second moment of area is, the easier the optical cable is bent, and the two or more axes each having the minimum value enable the optical cable to be bent by forces in two or more directions with the same magnitude thereof. However, the second moment of area at the A-A' plane and the second moment of area at the B-B' plane may be the same or different.

As the material of the tension fiber 22, aramid or the like can be exemplified. As the material of the sheath 23, polyethylene, flame-retardant polyethylene, polyvinyl chloride or the like can be exemplified. These structures are similarly adopted in embodiments to be described later.

Figure 6:
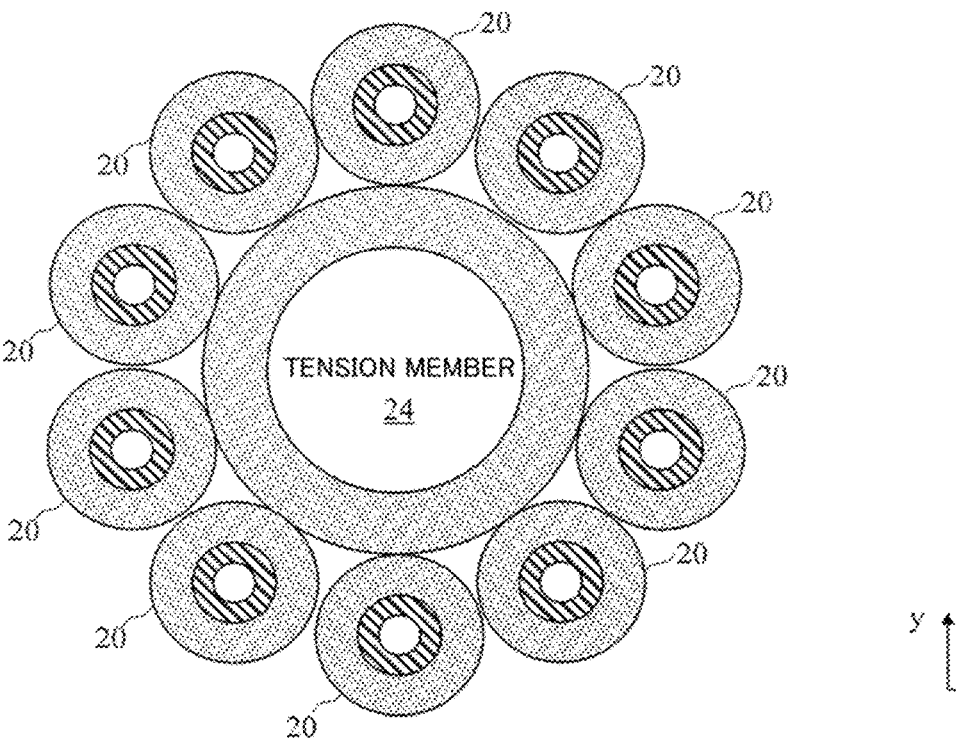
FIG. 6 is a diagram illustrating an example of a structure of an optical cable according to the present disclosure.

In the optical fiber cable according to the present embodiment, as shown in FIG. 6, a shape of the optical fiber cable in which N (where N≥3) drop optical cables are assembled has two or more axes each having the minimum value of the second moment of area with respect to arbitrary neutral planes. The drop optical cables 20 are stacked in one layer to form a structure having a tension member 24 inside the assembled drop optical cables. Since the drop optical cables 20 constitute one layer, the drop optical cable 10 is uniformly arranged on the outer periphery around the tension member 24. Furthermore, since the number of the drop optical cables 20 is an even number such as 10, the load of each drop optical cable 20 can be reduced when the tension member 24 is bent. As shown in FIG. 6, a sheath 23 may be disposed between the tension member 24 and each drop optical cable 20.

Although an example has been described in which the present drop optical cable 20 has a circular cross-sectional shape, the cross-sectional shape may be a regular polygon such as an equilateral triangle, a square, or a regular hexagon. In these examples, the neutral planes of the N drop optical cables 20 are arranged so as to be orthogonal to a straight line connecting the center of the drop optical cables 20 and the center of the tension member 24. Thus, each drop optical cable 20 is more easily bent in a direction away from the tension member 24.

The present optical fiber cable also has no dependence on the laying direction, and the optical cable can bend freely in the vertical and horizontal directions, and the optical fiber can be provided without performing connecting work. The drop optical cable 20 separated from the optical fiber cable is also not dependent on the laying direction, and can be freely bent in the vertical and horizontal directions. Therefore, the optical fiber cable of the present embodiment eliminates the need for work to twist the drop optical cable immediately before a place where the drop optical cable is bent and work to fix the twisted drop optical cable to the ground by a staple or the like so that the twisted drop optical cable does not return to an original state, which are required by conventional collective drop optical cables, and, furthermore, the optical fiber cable can be laid without the need for a fixing part such as a staple. Furthermore, the optical fiber cable of the present embodiment has a structure capable of withstanding tension when the optical cable is laid, because it has a tension member 24 inside the drop optical cable.

Embodiment 4

The structure of the optical cable of the present disclosure will be described with reference to FIGS. 7A and 7B.

Figure 7A:
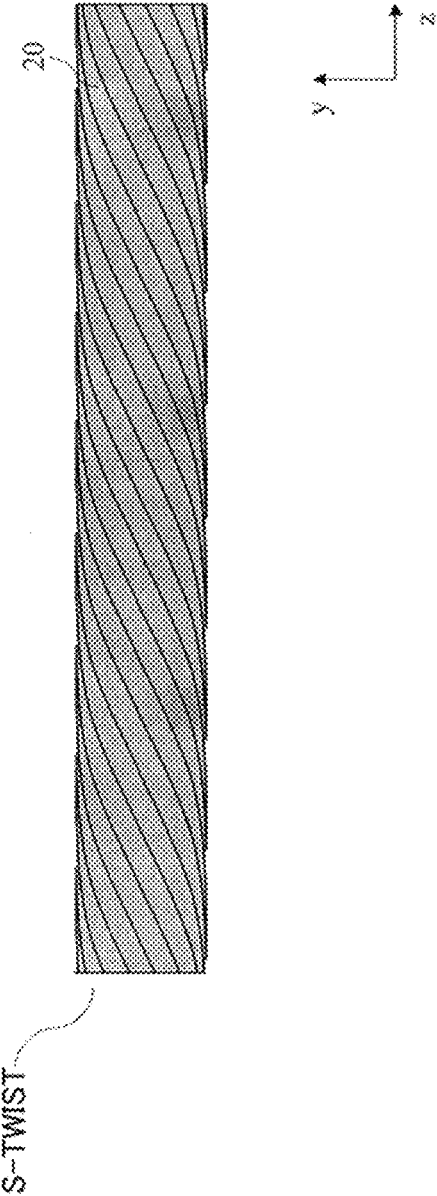
FIG. 7A is a diagram illustrating an example of a structure of an optical cable according to the present disclosure.
Figure 7B:
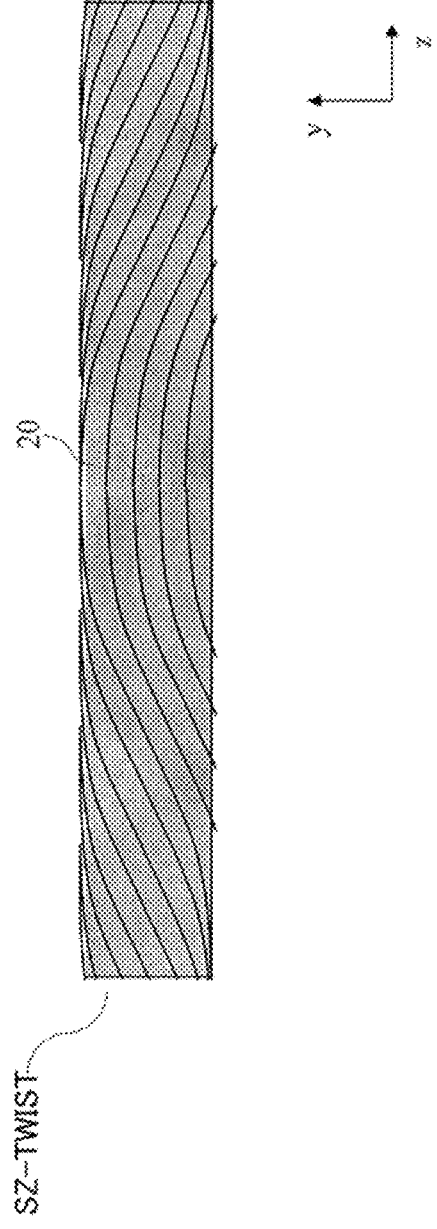
FIG. 7B is a diagram illustrating an example of a structure of an optical cable according to the present disclosure.

In the optical fiber cable according to the present embodiment, the method for assembling the drop optical cable 20 shown in FIG. 6 is S-twist shown in FIG. 7A or SZ-twist shown in FIG. 7B.

The present optical fiber cable also has no dependence on the laying direction, the optical cable can bend freely in the vertical and horizontal directions, and the optical fiber can be provided without performing connecting work. The drop optical cable 20 separated from the optical fiber cable is also not dependent on the laying direction, and can be freely bent in the vertical and horizontal directions. Therefore, the optical fiber cable of the present embodiment eliminates the need for work to twist the drop optical cable immediately before a place where the drop optical cable is bent and work to fix the twisted drop optical cable to the ground by a staple or the like so that the twisted drop optical cable does not return to an original state, which are required by conventional collective drop optical cables, and, furthermore, the optical fiber cable can be laid without the need for a fixing part such as a staple. Furthermore, the optical fiber cable of the present embodiment has a structure capable of suppressing the occurrence of distortion due to a difference in line length between the inside and outside of a drum when the optical fiber cable is wound around the drum.

Embodiment 5

The structure of the optical fiber cable of the present disclosure will be described with reference to FIG. 8.

Figure 8:
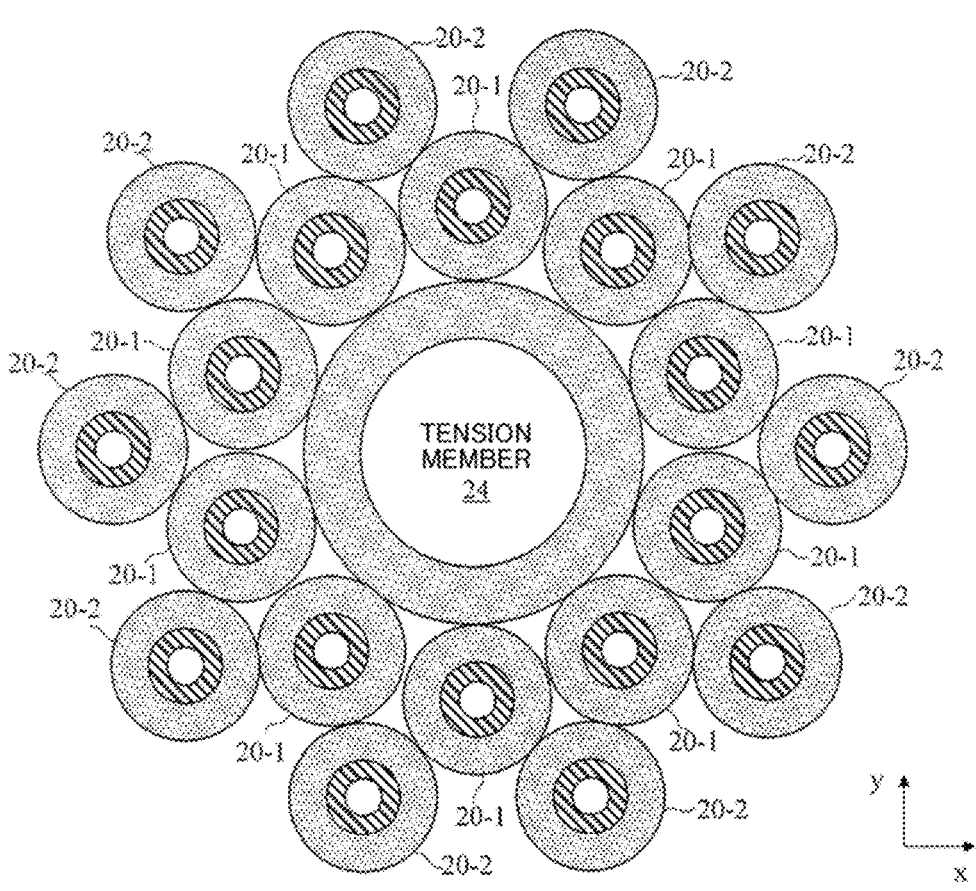
FIG. 8 is a diagram illustrating an example of a structure of an optical cable according to the present disclosure.

In the optical fiber cable according to the present embodiment, as shown in FIG. 8, a shape in which the drop optical cables 20 are assembled over a plurality of layers has two or more axes each having the minimum value of the second moment of area with respect to arbitrary neutral planes. Each drop optical cable 20 is stacked in one layer to form a structure having a tension member 24 inside the assembled drop optical cable 20.

The number of the drop optical cables in the first layer is three or more, and as the collecting method of the assembled drop optical cables, twisting such as S-twisting or SZ-twisting is preferably added. A sheath 23 may be disposed between the tension member 24 and each drop optical cable 20.

Since the present optical fiber cable has a structure having two or more axes each having a minimum value of a second moment of area with respect to arbitrary neutral planes, there is no dependence on a laying direction, the optical fiber can be bent freely in the vertical and horizontal directions, the optical fiber cable can be provided without performing connecting work, and the optical cable has a structure capable of suppressing the occurrence of distortion due to a line length difference generated between the inside and the outside of a drum when the optical cable is wound around the drum. In addition, when the number of the drop optical cables is the same, the diameter of the present optical fiber cable can be made smaller than that of the optical cable in which the drop optical cables are gathered only in one layer.

INDUSTRIAL APPLICABILITY

The present disclosure is applicable to the information communication industry.

REFERENCE SIGNS LIST

1, 10-1, 10-2, 10-3, 10-4, 10-6, 10-7, 10-9, 20 Drop optical cable
11 Optical fiber core
12, 24, Tension member
13, 23 Sheath
22 Tension fiber

The invention claimed is:

1. An optical fiber cable in which a plurality of drop optical cables are bundled, wherein each of the drop optical cables has, in a cross section perpendicular to a longitudinal direction thereof, two or more neutral planes minimalizing a second moment of area; and wherein $2N^2-2N+1$ (where N=1, 2, 3, . . . ) drop optical cables are arranged in a rhomboid shape on a cross section of the optical fiber cable, and each of the neutral planes of the plurality of drop optical cables is parallel to a diagonal line of the rhomboid shape.

2. The optical fiber cable according to claim 1, wherein each of the drop optical cables comprises an optical fiber core arranged at the center thereof, a sheath covering a periphery of the optical fiber core, and
a tension member or a tension fiber embedded in the sheath symmetrically with respect to the neutral planes.

3. The optical fiber cable according to claim 1, wherein the N (where N≥3) drop optical cables are uniformly arranged in an outer periphery around tension member, and the neutral planes of the N drop optical cables are orthogonal to a straight line connecting the center of the drop optical cables and the center of the tension member.

4. The optical fiber cable according to claim 3, wherein the N drop optical cables are arranged in S-twist or SZ-twist around the tension member.

5. The optical fiber cable according to claim 1, wherein each of the plurality of drop optical cables have a cross-sectional shape regarded as a regular polygon, and
a tension member is disposed at each corner.

* * * * *